United States Patent Office 3,442,884
Patented May 6, 1969

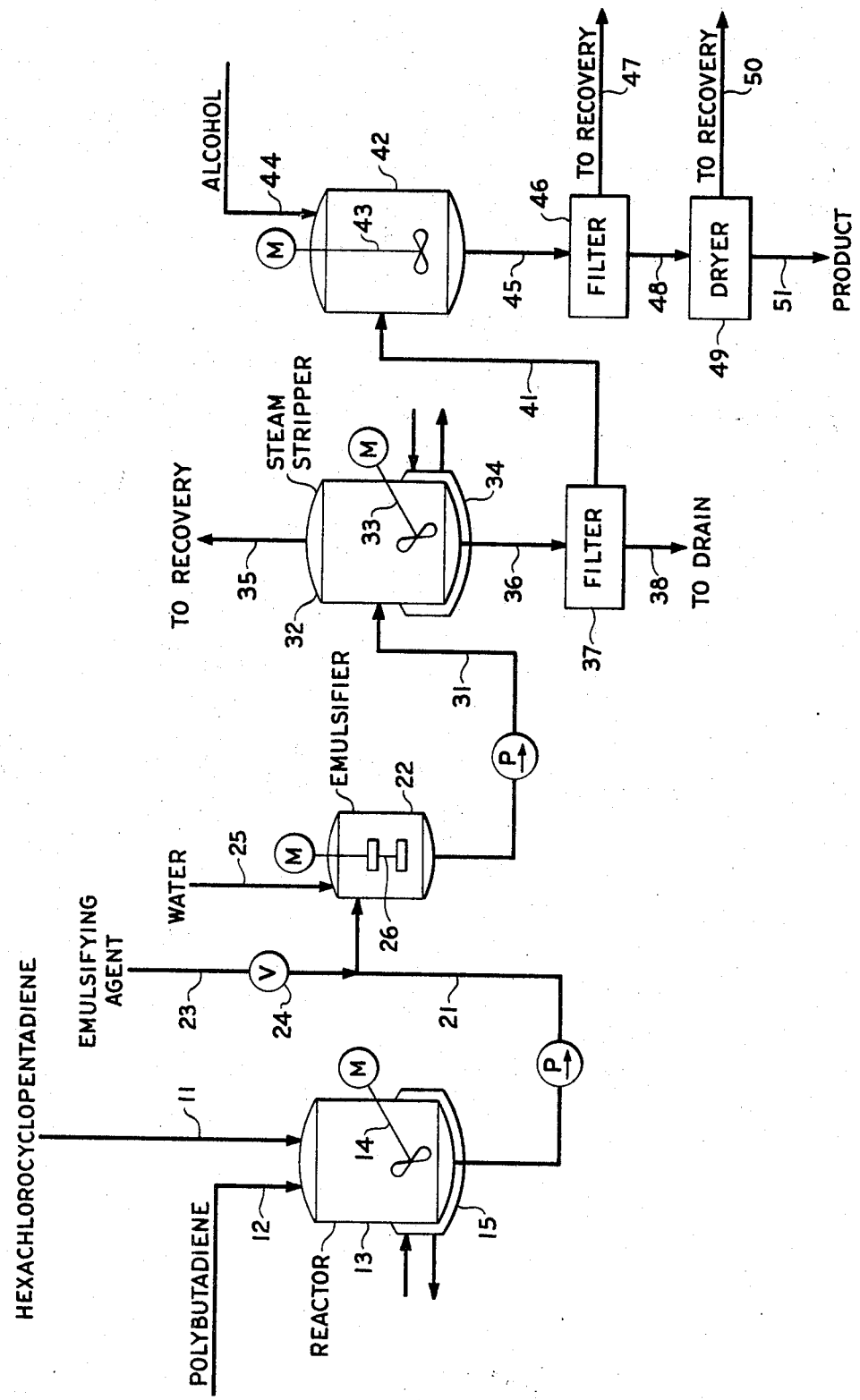

3,442,884
POLYMER RECOVERY PROCESS
Paul E. Hoch, Youngstown, and George B. Stratton, Lewiston, N.Y., assignors to Hooker Chemical Corporation, Niagara Falls, N.Y., a corporation of New York
Continuation-in-part of application Ser. No. 293,157, July 5, 1963. This application Sept. 24, 1965, Ser. No. 489,893
Int. Cl. C08f 1/96, 27/02
U.S. Cl. 260—94.7
14 Claims

ABSTRACT OF THE DISCLOSURE

Polymeric materials which generally contain less than 1 percent unreacted polyhalogenated cyclopentadiene are recovered from a solution of polyhalogenated cyclopentadiene-polybutadiene in unreacted polyhalogenated cyclopentadiene by a process which comprises: heating an emulsion comprised of (a) the polymer of a butadiene polymer and a polyhalogenated cyclopentadiene, (b) unreacted polyhalogenated cyclopentadiene, (c) an emulsifying medium, and (d) an emulsifying agent, to an elevated temperature to evaporate a portion of the unreacted polyhalogenated cyclopentadiene and to provide a polymer containing the remaining unreacted polyhalogenated cyclopentadiene; contacting the polymer with an alcoholic medium to remove unreacted polyhalogenated cyclopentadiene therefrom, and thereafter separating the alcohol and the unreacted polyhalogenated cyclopentadiene from the polymer. In another embodiment of the invention, the emulsion is heated to form a slurry which is separated into a liquid phase and a solid polymer phase, and the resulting solid polymer phase is contacted with an alcohol to remove the remaining unreacted polyhalogenated cyclopentadiene from the solid polymer. Another embodiment of the invention relates to subjecting the aforesaid emulsion to hot gases to evaporate a portion of the unreacted polyhalogenated cyclopentadiene and form solid polymer particles, which are thereafter contacted with an alcoholic medium to remove the residual unreacted polyhalogenated cyclopentadiene therefrom.

---

This is a continuation-in-part of application Ser. No. 293,157, filed July 5, 1963.

This invention relates to the recovery of polymers from solution. In another aspect, the invention relates to the purification of polymers to remove extraneous materials therefrom. More particularly, the invention relates to the recovery and purification of polymers formed by the reaction of a polyhalogenated cyclopentadiene with a butadiene polymer.

Highly useful halogen-containing polymeric materials are produced by reacting a polymer of butadiene with polyhalogenated cyclopentadienes having the formula:

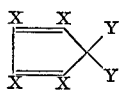

wherein X is selected from the group consisting of fluorine, chlorine and bromine, and Y is selected from the group consisting of fluorine, chlorine, bromine and an alkoxy radical. Generally, the alkoxy radicals have 1 or 2 carbon atoms, but higher carbon chain links, for example, up to 4 carbon atoms, can be employed. Typical polyhalogenated cyclopentadienes are hexachloropentadiene, hexabromocyclopentadiene, 1,1-dibromotetrachlorocyclopentadiene, 1,1-difluorotetrachlorocyclopentadiene, 1,1-dimethoxytetrachlorocyclopentadiene, 1,1-diethoxytetrachlorocyclopentadiene, and the like. Polymers of butadiene that can be reacted or adducted with the polyhalogenated cyclopentadienes are the various ethylenically unsaturated polybutadienes prepared by mass, solution or emulsion polymerization techniques, butadiene-styrene copolymers made by emulsion and solution methods, butadiene-styrene block copolymers, butadiene-acrylonitrile copolymers, and the like. Particularly useful are the polybutadienes which contain at least 30 percent of the cis 1,4-configuration, and preferably at least 80 percent of the cis 1,4-configuration, and still more preferably at least 90 percent of the cis 1,4-configuration.

In the process for adducting the halogenated cyclopentadiene to a butadiene polymer by the Diels-Alder reaction, it is preferred to utilize in the reaction mixture at least about 5 parts of polyhalogenated cyclopentadiene per part of butadiene polymer. However, lower ratios, such as 3 or 4 parts of halogenated cyclopentadiene can be used per part of butadiene polymer, but longer reaction times are then desirable. Much larger quantities of halogenated cyclopentadiene can be utilized, e.g., up to 100 parts of halogenated cyclopentadiene per part of butadiene polymer and higher. In fact, it is convenient to use the halogenated cyclopentadiene as the diluent in the reaction mixture. However, other diluents that are not deleterious to the reaction can be used, for example, the aromatic hydrocarbons such as benzene, toluene, xylene, and the like; chlorinated hydrocarbons such as trichloroethylene, tetrachloroethane, the chlorobenzenes, the chlorotoluenes, and the like; esters such as isobutyl acetate, ethyl butyrate, and the like. The ratio of solvent used in the reaction mixture generally does not exceed about 100 parts per part of butadiene polymer reacted. The reaction proceeds best at elevated temperatures, generally in the range of 70 to 200 degrees centigrade, preferably in the range of 100 to 170 degrees centigrade. It is generally convenient to conduct the reaction at atmospheric pressure, although, depending on the use of particular diluents and reaction temperatures, it is sometimes convenient to carry out the reaction at superatmospheric pressure or under vacuum. During the course of the reaction, some halogen halide may be produced. The color of the resulting product can be improved by absorbing the hydrogen halide by including a scavenger, such as an epihalohydrin or other epoxide, in the reaction zone. It is sometimes desirable to include other additives in the reaction mixture to control the molecular weight of the polymer product.

In most product applications, it is desirable to utilize the halogenated polymer of the invention in a form that is substantially free of unreacted halogenated cyclopentadiene. However, because of the relatively high boiling points of the halogenated cyclopentadienes, it is somewhat difficult to remove the unreacted polyhalogenated cyclopentadiene from the reaction product.

Accordingly, an object of the invention is to provide an improved process for the recovery of the adduct of a butadiene polymer and a polyhalogenated cyclopentadiene from the reaction mixture from which the polymer is produced. Another object of the invention is to provide a process for the production of an adduct of a butadiene polymer and a polyhalogenated cyclopentadiene that is substantially free of unreacted polyhalogenated cyclopentadiene. A further object of the invention is to provide a polyhalogenated polymer product that has a low, residual polyhalogenated cyclopentadiene content. These and other objects and advantages of the invention will be apparent to one skilled in the art upon reading the following detailed specification and the accompanying drawing.

In accordance with this invention, there is provided a process which comprises heating an emulsion comprised of (a) the polymer of a butadiene polymer and a polyhalogenated cyclopentadiene, (b) unreacted polyhalogenated cyclopentadiene, (c) an emulsifying medium, and (d) an emulsifying agent, to an elevated temperature to evaporate a portion of the unreacted polyhalogenated cyclopentadiene and to provide polymer containing the remaining unreacted polyhalogenated cyclopentadiene; contacting the polymer with an alcoholic medium to remove unreacted polyhalogenated cyclopentadiene therefrom, and thereafter separating the alcohol and the unreacted polyhalogenated cyclopentadiene from the polymer. In a preferred method of the invention, the emulsion is heated to an elevated temperature to evaporate a portion of the unreacted polyhalogenated cyclopentadiene, and to form a slurry of solid polymer containing the remaining unreacted polyhalogenated cyclopentadiene. Thereafter, the slurry of polymer and emulsifying medium is separated into a liquid phase and a solid polymer phase, and the resulting solid polymer phase is contacted with an alcohol to remove the remaining unreacted polyhalogenated cyclopentadiene from the solid polymer. In another embodiment of the invention, the solid polymeric material can be obtained by subjecting the aforesaid emulsion to hot gases, such as in a spray dryer, to evaporate a portion of the unreacted polyhalogenated cyclopentadiene and to form solid polymer particles, which are thereafter contacted with an alcoholic medium to remove the residual unreacted polyhalogenated cyclopentadiene therefrom. The polymeric material which contains residual, unreacted polyhalogenated cyclopentadiene is generally in solid form, i.e., free flowing particles, such as powder, granules, flakes, or other comminuted or particulate form. The polymer is in the normally solid state at 30 degrees centigrade. By forming the polymer solids in the aforesaid manner, it is possible to produce polymer products having lower levels of residual unreacted polyhalogenated cyclopentadiene than has been heretofore possible in this art.

The invention will be further described by reference to the accompanying drawing which is a flow sheet for a preferred embodiment of the process of the invention.

A polyhalogenated cyclopentadiene, such as hexachlorocyclopentadiene, and a butadiene polymer such as polybutadiene, are introduced through conduits 11 and 12, respectively, into reactor 13. The reaction zone can comprise a single reactor operated either batchwise or continuously, or a group of reactors operated either batchwise or continuously in series and/or in parallel. Reactor 13 is provided with suitable agitation means such as agitator 14, and suitable heating means such as heating jacket 15. After a suitable reaction cycle in accordance with the disclosure given hereinafter, the reaction mixture is transferred through conduit 21 to emulsifier 22. A suitable emulsifying agent is transferred through conduit 23 and control valve 24 to the reaction mixture in conduit 21. Alternatively, the emulsifying agent can be injected directly into the emulsifier 22. Water is introduced to emulsifier 22 through conduit 25. The components are subjected to vigorous agitation by a suitable agitator 26 and the resulting emulsion is transferred through conduit 31 to steam stripper 32. The steam stripping zone preferably comprises an enclosed vessel equipped with suitable agitation means such as agitator 33 and suitable heating means such as heat jacket 34. The steam stripping vessel can also be heated directly with open steam which can be introduced through suitable pressure nozzles (not shown). Vapors from the steam stripper 32, comprising unreacted hexachlorocyclopentadiene, water and other impurities, are taken overhead through conduit 35 to recovery facilities (not shown). The hexachlorocyclopentadiene can be readily separated from the water and other impurities and recycled to the reaction zone. The aqueous slurry of polymer particles produced in the steam stripper 32 is transferred through conduit 36 to filter 37 for separation of a solid polymer phase from the aqueous phase which is discharged from the filter through conduit 38 for disposal or for recycle to conduit 25. The solid polymer phase is transferred from the filter through conduit 41 to zone 42. The transfer of the solid polymer phase can be readily accomplished by suitable means such as a conveyor belt, an auger, or by gravity flow. Zone 42 can comprise an enclosed vessel equipped with suitable agitation means such as agitator 43. Zone 42 is supplied with a suitable amount of alcoholic extraction medium through conduit 44, and the resulting alcoholic slurry of polymer particles is transferred through conduit 45 to filter 46. In the filtration zone, the bulk of the alcohol together with the hexachlorocyclopentadiene extracted from the polymer particles is separated from a solid polymer phase and discharged through conduit 47 to suitable recovery facilities (not shown). The alcohol and hexachlorocyclopentadiene can be readily separated, such as by distillation, for recycle to conduits 44 and 11, respectively. The solid polymer is discharged from filter 46 through conduit 48 to dryer 49. Residual volatile matter, such as alcohol, hexachlorocyclopentadiene, water and other volatile compounds are discharged from the dryer 49 through conduit 50. The dry polymer product is recovered from the dryer through conduit 51.

The preferred emulsifying medium is water. However, other emulsifying media can be employed, such as the dihydric alcohols, for example, ethylene glycol, diethylene glycol, propylene glycol, dipropylene glycol, and other alkylene glycols. Also suitable as emulsifying media are trihydric alcohols, such as glycerol, and the like. Various proportions of emulsifying media can be employed, depending somewhat upon subsequent process operations. However, the ratio is generally in the range up to 5 parts of emulsifying media, such as water, per part of reaction mixture, such as polymer and unreacted polyhalogenated cyclopentadiene. The ratio is preferably in the range of 0.5 to 2 parts of emulsifying medium per part by weight of reaction mixture.

Various emulsifying agents can be employed, including the non-ionic, anionic and cationic types, as well as mixtures thereof, such as mixtures of non-ionic and anionic types. Suitable non-ionic emulsifying agents include the alkylphenoxypoly(ethyleneoxy)ethanols, and the dialkylphenoxypoly(ethyleneoxy)ethanols, preferably those wherein the alkyl substituent has 5 to 12 carbon atoms, and which have 1 to 20 ethylenoxy groups. Typical members are octylphenoxypoly(ethylenoxy)ethanol, nonylphenoxypoly(ethylenoxy)ethanol and dodecylphenoxypoly(ethylenoxy)ethanol. Also useful are the fatty acid esters of polyhydric alcohols or ether alcohols, for example, glycerol mono-stearate; esters of ethylene glycol, diethylene glycol, triethylene glycol and polyethylene glycol, for example, the condensation product of oleic acid with ethylene oxide; and fatty esters of sugar alcohols. Suitable anionic emulsifying agents include the alkali metal alkylbenzene sulfonates, particularly those wherein the alkali metal is sodium or potassium and the alkyl group has 8 to 20 carbon atoms. Typical members are sodium dodecylbenzene sulfonate and potassium dodecylbenzene sulfonate. Another suitable group of anionic emulsifying agents is the alkali metal alkyl sulfates, particularly those wherein the alkali metal is sodium or potassium and the alkyl group has 8 to 20 carbon atoms. A typical member is sodium lauryl sulfate. Also useful are the sulfonated aliphatic polyesters, free acids of complex phosphate esters, sodium salts of complex phosphate esters and sodium salt of disproportionated wood rosin. Another suitable group of anionic emulsifying agents is the alkali metal lignin sulfonates, such as sodium lignin sulfonate and potassium lignin sulfonate. Suitable cationic emulsifying agents include the fatty amides of monoethanolamines; fatty nitriles and fatty acid amides, such as olein morpholide. Also useful are cationic agents such as N-coco-β-amino buteric acid, dicoco dimethyl ammonium chloride and polyoxyethylated alkylamines. Particularly suited for use in the process of the invention are mixtures of an anionic agent and a nonionic agent, such as a mixture of a sodium alkylbenzene sulfonate and an alkylphenoxypoly(ethyleneoxy)ethanol. The emulsifying agents are employed in a ratio of about 1 to 5 parts by weight per 100 parts of the butadiene polymer-polyhalogenated cyclopentadiene reaction product. Preferably, the ratio is in the range of 2 to 4 parts per 100 parts by weight.

Emulsification of the reaction product is generally conducted at a temperature up to about 150 degrees centigrade, preferably in the range of 25 to 140 degrees centigrade. Residence time in the emulsification zone can vary considerably depending on the type of equipment employed, but would generally be in the range of 0.1 to 10 minutes. Emulsification can be carried out in various mechanical devices which subject the components to vigorous agitation. A small vessel equipped with any efficient mixer, such as a paddle-type mixer is suitable, or other more elaborate devices, such as a high speed turbine, which gives high shear agitation, can also be employed, in batch or continuous processes.

In the preferred embodiment of the invention, the emulsified reaction product is subjected to steam stripping to remove a portion of the unreacted polyhalogenated cyclopentadiene and to form the solid polymer suitable for final purification. The emulsion is introduced to the stripping zone and maintained at a temperature in the range of 20 to 100 degrees centigrade, preferably 50 to 80 degrees centigrade. Operation under vacuum is usually desirable to prevent break-up of the emulsion and to facilitate the evaporation of the high boiling polyhalogenated cyclopentadiene. The steam stripping zone can be operated at a pressure of 1 to 30 pounds per square inch absolute, more usually at 1 to 15 pounds and preferably at 1 to 5 pounds per square inch absolute. Residence time in the steam stripping zone can vary considerably, but is generally in the range of 0.1 to 5 hours, preferably 0.1 to 2 hours for a continuous process. For a batch process, the stripping time can be up to 24 hours or longer. The stripping zone can comprise a single enclosed vessel such as depicted in the accompanying drawing or can comprise two or more enclosed vessels operated in series. The overhead vapors from the steam stripping zone are condensed, and the polyhalogenated cyclopentadiene is recovered from the condensate and purified, such as by distillation for return to the reaction zone. The aqueous slurry of solid polymer produced in the stripping zone is filtered or centrifuged for recovery of the solid polymer therefrom. Various types of batch or continuous filters and centrifuges that are commercially available can be employed.

In another embodiment of the invention the emulsified reaction product is contacted with hot gases to facilitate evaporation of the unreacted polyhalogenated cyclopentadiene, as well as the emulsifying medium, and to form the solid polymer suitable for treatment in final purification steps. The treatment with hot gases can be suitably accomplished in equipment such as spray dryers, shot dryers, and the like. The temperature is generally in the range of about 150 to 300 degrees centigrade, although higher and lower temperatures can be employed, depending upon the contact time with the hot gases. The contact time can vary considerably, but generally is in the range of from about 0.1 to 10 minutes, preferably 0.1 to 1 minute. Gases that can be employed are those that are non-reactive with the components of the emulsion. The off-gas from the contacting step is passed through a condenser to condense the volatile matter from which the polyhalogenated cyclopentadiene can be recovered for reuse in the process.

The recovered polyhalogenated polymer is contacted with an alcohol, generally of 1 to 10 carbon atoms, preferably of 3 to 8 carbon atoms, and which generally has a boiling point of up to about 230 degrees centigrade and which preferably boils in the range of 70 to 200 degrees centigrade. Typical acyclic alcohols include methanol, ethanol, allyl alcohol, propyl alcohol, isopropyl alcohol, butyl alcohol, amyl alcohol, hexyl alcohol, octyl alcohol, decyl alcohol, and the like. Suitable cycloaliphatic alcohols include cyclopentanol, cyclohexanol, and the like. Mixtures of the various alcohols can also be employed. In addition to the foregoing alcohols, the alcoholic medium can also comprise a minor proportion of another organic liquid or diluent. Suitable diluents for the alcohol include the aromatic hydrocarbons, for example of 6 to 8 carbon atoms, such as benzene, toluene, xylene, and the like; chlorinated hydrocarbons, for example of 2 to 8 carbon atoms, such as trichloroethylene, tetrachloroethane, the chlorobenzenes, the chlorotoluenes, and the like; esters, for example of 3 to 8 carbon atoms, such as isobutyl acetate, ethyl butyrate, and the like; and aliphatic ketones, for example of 3 to 8 carbon atoms, such as acetone, methyl ethyl ketone, diethyl ketone, methyl isobutyl ketone, dibutyl ketone, and the like. The alcoholic medium is comprised of a major amount of alcohol, preferably at least 75 weight percent alcohol, more preferably 85 to 95 percent alcohol, the remainder comprised of one or more of the foregoing diluents. The suitable alcohols do not appreciably swell or dissolve the polyhalogenated polymer.

The proportion of alcoholic medium employed depends somewhat on the contacting equipment and other variables used in the process. However, the alcoholic medium is generally employed in the ratio of about 2 to 20 parts by weight of alcoholic medium per part by weight of polyhalogenated polymer, perferably in the range of about 5 to 12 parts of alcoholic medium per part of polymer. Various contacting times and temperatures can be employed, but these will generally be in the range of 10 to 100 degrees centigrade, preferably 25 to 70 degrees centigrade, and 0.1 to 5 hours. The alcohol contacting step can be accomplished in batch-operated or continuously operated equipment of various types, Thus, the contacting process can be carried out in a single enclosed vessel in which the polymer containing residual polyhalogenated cyclopentadiene is introduced into a volume of alcohol and vigorously agitated. Thereafter, the polymer is permitted to settle to the bottom of the vessel and the supernatant liquid is decanted off to a suitable recovery process for the separation of the alcohol and the unreacted polyhalogenated cyclopentadiene. Subsequently, additional alcoholic medium can be introduced to the vessel to reslurry the solid polymer products to facilitate additional removal of residual polyhalogenated cyclopentadiene therefrom. This sequence of contacting steps can be repeated as often as desired. Alternatively, the treatment can be carried out in a series of enclosed vessels wherein the effluent of one vessel is phase separated, such as in a centrifuge, to recover the bulk of alcohol and the solid polymer is transferred to the next treating vessel in the series. The contacting step with alcohol can also be carried out in an apparatus in which the solid polymer is held substantially stationary and the treating liquid is circulated through the bed of solid polymer. The contacting step can also be carried out in a countercurrent contacting process wherein the solid polymer is passed countercurrent to a moving stream of alcohol. Thus, it is apparent that there are many methods for accomplishing the process of contacting the polyhalogenated polymer for removal of the residual, unreacted polyhalogenated cyclopentadiene therefrom.

Following the extraction process, the solid, purified polymer can be recovered from the alcoholic extraction medium in batch-operated or continously operated filters or centrifuges, and the like. Thereafter, the polymer is dried in a suitable batch-operated or coninuously operated drier, such as a rotary drier, tray drier, and the like. In the drying process, the solid polymer is generally contacted with the hot gas which is non-reactive with the polymer product, and which is at a temperature up to about 150 degrees centigrade. The liquid and vapor effluents from the final recovery steps in the process are passed to suitable recovery process for the separation of the polyhalogenated cyclopentadiene from the alcohol treating agent to facilitate recycle of components to the reaction and purification zones, respectively.

In another method, the emulsion of the polyhalogenated polymer, unreacted polyhalogenated cyclopentadiene and emulsifying medium can be heated to an elevated temperature to evaporate a portion of the unreacted polyhalogenated cyclopentadiene, and the resulting fluid mixture can be coagulated with an alcohol of the type described hereinbefore to provide a solid polymer product. The resulting solid polymer is recovered from the mixture of alcohol and emulsifying medium, and is subsequently alcohol-extracted to remove the residual, unreacted polyhalogenated cyclopentadiene.

The solid polymer product of the process of the invention generally contains less than about one weight percent of the high boiling, unreacted polyhalogenated cyclopentadiene, preferably less than about 0.5 weight percent. The following tabulation shows the effect of free or unreacted hexachlorocyclopentadiene on the melting range of the polyhalogenated polymer product.

Free hexachlorocyclopentadiene

| weight percent | Melting range, ° C. |
| --- | --- |
| 14.3 | 125–131 |
| 4.9 | 169–181 |
| 1.4 | 180–188 |
| 0.2 | 185–197 |

The foregoing data were obtained with a hexachlorocyclopentadienepolybutadiene product containing 58.9 weight percent chlorine and having $n$ of 0.324 measured in toluene. The melting range was observed by placing polymer between cover glasses on a Fisher-Johns hot stage.

The invention is further described in the following specific examples which are intended to further illustrate the invention, but not to limit it. In these examples, the temperatures are given in degrees centigrade and parts are by weight unless specified otherwise.

EXAMPLE 1

75 parts of a polybutadiene rubber having a cis-1,4 content of 95 percent were reacted with 900 parts of hexachlorocyclopentadiene in the presence of 18 parts of epichlorohydrin. The reaction zone was placed under a nitrogen atmosphere and the reactor contents were heated at about 100 degrees centigrade to dissolve the rubber. Thereafter, 0.1 part of meta-dinitrobenzene was added to the reactor, and the reaction was carried out for five hours with agitation at 150 degrees centigrade. The reactor contents were discharged from the reactor with 760 parts by weight of xylene. Then 100 parts of the resulting polymer solution were mixed with 75 parts of water and 2.5 parts of octylphenoxypoly(ethyleneoxy)ethanol containing about 10 ethyleneoxy groups per molecule, in a blender at 25 to 38 degrees centigrade. The resulting emulsion was introduced at a rate of about 200 parts by weight per minute to the upper portion of a spray drier in which it was contacted with a hot gas which entered the spray drier at 260 degrees centigrade and exited at about 190 to 200 degrees centigrade. In the spray drier, the unreacted hexachlorocyclopentadiene and water were vaporized and the vapors passed out of the drier with the hot gases. A solid polymer product was recovered from the bottom portion of the drier in particulate form. The spray dried product contained 4.9 weight percent unreacted hexachlorocyclopentadiene.

To 10 parts of the aforesaid spray dried polymer were mixed 78.1 parts by weight of isopropyl alcohol and 8.6 parts by weight of toluene. The mixture was agitated and heated for two hours at the reflux temperature. Thereafter, the liquid was filtered from the solid polymer, which was thereafter mixed with an additional 16 parts by weight of hot isopropyl alcohol. The polymer product was filtered and then dried in a vacuum oven for two hours at 100 degrees centigrade and 3 millimeters of mercury pressure. The resulting polymer product was analyzed in an ultraviolet spectrophotometer and found to contain only 0.6 weight percent of unreacted hexachlorocyclopentadiene. The polymer contained 60.4 weight percent chlorine and had an intrinsic viscosity of 0.283 when measured at 30 degrees in toluene.

EXAMPLE 2

80 parts of a polybutadiene rubber having a cis-1,4 content of at least 80 percent were reacted with 960 parts of hexachlorocyclopentadiene for five hours at 150 degrees centigrade with agitation. The resulting reaction mixture, which contained 67.5 weight percent free hexachlorocyclopentadiene was then cooled and emulsified with 2450 parts of water and 37 parts of octylphenoxypoly(ethyleneoxy)ethanol containing about 10 ethyleneoxy groups per molecule, in a blender. The resulting emulsion was then steam stripped for 36 hours at a temperature of 53 degrees centigrade and pressure of 100 millimeters of mercury absolute. The resulting slurry was filtered to recover a solid particulate polymer, which was dried in a rotary dryer at a temperature of 80 degrees centigrade and a pressure of 200 millimeters of mercury absolute. 570 parts of polymer containing 14.3 weight percent unreacted hexachlorocyclopentadiene were obtained.

100 parts of the thus produced polymer were placed in a Soxhlet extractor and treated with 780 parts of isopropyl alcohol for a period of 11 hours at 70 to 80 degrees centigrade. The treated polymer was dried for four hours at 90 degrees centigrade and 2 millimeters of mercury absolute. The purified polymer was analyzed and found to contain only 0.62 weight percent unreacted hexachlorocyclopentadiene.

EXAMPLES 3 AND 4

The procedures of Examples 1 and 2 are repeated except that the isopropyl alcohol is replaced with normal amyl alcohol to provide polymer products containing less than one percent unreacted hexahalocyclopentadiene.

EXAMPLE 5

100 parts of the polymer solution of Example 2 were emulsified with 100 parts of water and 3.5 parts of octylphenoxypoly(ethyleneoxy) ethanol containing about 10 ethyleneoxy groups per molecule at 35 degrees centigrade for 3 minutes in a vessel equipped with a high speed agitator. The resulting emulsion was diluted with an additional 200 parts of water, and was then steam stripped at 53 degrees centigrade and 100 millimeters of mercury absolute for 20 hours. About 100 parts of emulsion remained at the end of the steam stripping operation, and about 59 parts of unreacted hexachlorocyclopentadiene were recovered from the distillate for recycle to the reaction zone. The resulting concentrated emulsion-suspension was treated with 117 parts of isopropyl alcohol by holding at the reflux temperature of the mixture for 10 minutes. The resulting precipitated solid polymer was filtered from the hot suspension and washed with 19.5 parts of isopropyl alcohol. The solid product was stirred with 117 parts by weight of isopropyl alcohol for two hours at the reflux temperature, filtered and washed with 19.5 parts of isopropyl alcohol. The alcohol treatment was repeated, and the resulting solid product was dried at 100 degrees centigrade to provide 31 parts (96 percent yield) of white powder which contained 0.7 weight percent unreacted hexachlorocyclopentadiene.

While the invention has been described with reference

What is claimed is:

1. A process for obtaining a polymer product containing less than about 1 weight percent of unreacted polyhalogenated cyclopentadiene which comprises heating an emulsion comprised of (a) a polymer of a polybutadiene having at least 80 percent of cis-1,4 configuration and a polyhalogenated cyclopentadiene, (b) unreacted polyhalogenated cyclopentadiene, (c) an emulsifying medium, and (d) an emulsifying agent, to an elevated temperature sufficient to evaporate a portion of the unreacted polyhalogenated cyclopentadiene and to provide polymer containing residual, unreacted polyhalogenated cyclopentadiene; contacting the polymer with an alcoholic medium to remove unreacted polyhalogenated cyclopentadiene therefrom; and separating the alcoholic medium and the unreacted polyhalogenated cyclopentadiene from the polymer.

2. A process for obtaining a polymer product containing less than about 1 weight percent of unreacted polyhalogenated cyclopentadiene which comprises (1) heating an emulsion comprised of (a) a polymer of a polybutadiene having at least 80 percent of cis-1,4 configuration and a polyhalogenated cyclopentadiene, (b) unreacted polyhalogenated cyclopentadiene, (c) an emulsifying medium, and (d) an emulsifying agent, to an elevated temperature sufficient to evaporate a portion of the unreacted polyhalogenated cyclopentadiene and to form a slurry of polymer containing residual, unreacted polyhalogenated cyclopentadiene, (2) separating said slurry into a liquid and a polymer phase, (3) contacting said polymer phase with an alcoholic medium to remove unreacted polyhalogenated cyclopentadiene therefrom, and (4) separating the alcoholic medium and the unreacted cyclopentadiene from the polymer.

3. A process for obtaining a polymer product containing less than about 1 weight percent of unreacted polyhalogenated cyclopentadiene which comprises (1) heating an emulsion comprised of (a) a polymer of a polybutadiene having at least 80 percent of cis-1,4 configuration and hexachlorocyclopentadiene (b) hexachlorocyclopentadiene, (c) water and (d) an emulsifying agent, to an elevated temperature sufficient to evaporate the major proportion of unreacted hexachlorocyclopentadiene and to form an aqueous slurry of solid polymer containing the minor proportion of unreacted hexachlrocyclopentadiene, (2) separating said aqueous slurry into an aqueous phase and a solid polymer phase (3) contacting said polymer phase with an alcohol of 3 to 8 carbon atoms to remove unreacted hexachlorocyclopentadiene therefrom, and (4) separating the alcohol and unreacted hexachlorocyclopentadiene from the polymer.

4. The process of claim 3 wherein the alcohol is isopropyl alcohol.

5. The process of claim 3 wherein the alcohol is amyl alcohol.

6. A process for obtaining a polymer product containing less than about 1 weight percent of unreacted polyhalogenated cyclopentadiene which comprises (1) heating an emulsion comprised of (a) a polymer of a polybutadiene having at least 80 percent of cis-1,4 configuration and a polyhalogenated cyclopentadiene, (b) unreacted polyhalogenated cyclopentadiene, (c) an emulsifying medium and (d) an emulsifying agent, to about 150 to 300 degrees centigrade by contact with non-reactive hot gases to evaporate a portion of the unreacted polyhalogenated cyclopentadiene and to form a solid ploymer containing residual, unreacted polyhalogenated cyclopentadiene, (2) contacting the polymer with an alcoholic medium to remove unreacted polyhalogenated cyclopentadiene therefrom, and (3) separating the alcoholic medium and the unreacted polyhalogenated cyclopentadiene from the polymer.

7. A process for obtaining a polymer product containing less than about 1 weight percent of unreacted polyhalogenated cyclopentadiene which comprises (1) heating an emulsion comprised of (a) a polymer of a polybutadiene having at least 80 percent of cis-1,4 configuration and hexachlorocyclopentadiene, (b) hexachlorocyclopentadiene, (c) water, and (d) an emulsifying agent, to about 150 to 300 degrees centigrade by contact with non-reactive gases to evaporate the major proportion of unreacted hexachlorocyclopentadiene and to form solid polymer containing the minor proportion of unreacted hexachlorocyclopentadiene, (2) contacting said solid polymer with an alcohol of 3 to 8 carbon atoms to remove unreacted hexachlorocyclopentadiene therefrom, and (3) separating the alcohol and unreacted hexachlorocyclopentadiene from the polymer.

8. The process of claim 7 wherein the hot gas is at a temperature in the range of 150 to 300 degrees centigrade.

9. The process of claim 8 wherein the alcohol is isopropyl alcohol.

10. The process of claim 8 wherein the alcohol is amyl alcohol.

11. A process for obtaining a polymer product containing less than about 1 weight percent of unreacted polyhalogenated cyclopentadiene which comprises (1) emulsifying the product of the reaction of polybutadiene having at least 80 percent of cis-1,4 configuration and a polyhalogenated cyclopentadiene with an emulsifying medium and with an emulsifying agent, (2) heating the resulting emulsion to an elevated temperature sufficient to evaporate a portion of the unreacted polyhalogenated cyclopentadiene and to provide polymer containing residual, unreacted polyhalogenated cyclopentadiene, (3) contacting said solid polymer with an alcoholic medium comprised of a major proportion of an alcohol of 1 to 10 carbon atoms to remove unreacted, polyhaolgenated cyclopentadiene therefrom, and (4) separating the alcoholic medium and unreacted polyhalogenated cyclopentadiene from the polymer.

12. A process for obtaining a polymer product containing less than about 1 weight percent of unreacted polyhalogenated cyclopentadiene which comprises (1) reacting polybutadiene having at least 80 percent of cis-1,4 configuration with at least 3 parts by weight of a polyhalogenated cyclopentadiene per part of butadiene polymer, (2) emulsifying the resulting mixture with an emulsifying medium and with an emulsifying agent, (3) heating the resulting emulsion to an elevated temperature sufficient to evaporate a portion of the unreacted polyhalogenated cyclopentadiene and to form a solid polymer containing residual, unreacted polyhalogenated cyclopentadiene, (4) contacting said solid polymer with an alcoholic medium comprised of a major proportion of an aliphatic alcohol which boils at a temperature in the range up to 230 degrees centigrade to remove the unreacted polyhalogenated cyclopentadiene therefrom, and (5) separating the alcoholic medium and unreacted polyhalogenated cyclopentadiene from the polymer.

13. A process which comprises (1) reacting a polybutadiene having at least 80 percent of cis-1,4 configuration with at least 5 parts by weight of hexachlorocyclopentadiene per part of polybutadiene, (2) emulsifying the resulting reaction product with water as emulsifying medium, (3) heating the resulting emulsion to an elevated temperature sufficient to evaporate the major proportion of the unreacted hexachlorocyclopentadiene and to form an aqueous slurry of solid polymer containing a minor proportion of the unreacted hexachlorocyclopentadiene, (4) separating said aqueous slurry into an aqueous phase and a solid polymer phase, (5) contacting said solid polymer phase with aliphatic alcohol which boils within the range of 70 to 200 degrees centigrade to remove unreacted hexachlorocyclopentadiene therefrom, (6) recovering a polymer product containing less than about one weight percent of unreacted hexachlorocyclopentadiene.

14. A process which comprises (1) reacting a polybutadiene having at least 80 percent of cis-1,4 configuration with at least 5 parts by weight hexachlorocyclopentadiene per part of polybutadiene, (2) emulsifying the resulting reaction product with water as emulsifying medium, (3) heating the resulting emulsion to an elevated temperature in contact with non-reactive hot gases, sufficient to evaporate the major proportion of the unreacted hexachlorocyclopentadiene and to form a solid polymer containing a minor proportion of the unreacted hexachlorocyclopentadiene, (4) contacting said solid polymer with an aliphatic alcohol which boils at a temperature within the range of 70 to 200 degrees centigrade to remove unreacted hexachlorocyclopentadiene therefrom, and (5) recovering a polymer product containing less than about one weight percent of unreacted hexachlorocyclopentadiene.

References Cited

UNITED STATES PATENTS

| | | | |
|---|---|---|---|
| 2,917,495 | 12/1959 | Cobb et al. | 260—94.7 |
| 3,325,464 | 6/1967 | Weil | 260—94.7 |
| 3,225,022 | 12/1965 | Anderson et al. | 260—94.9 |
| 3,227,703 | 1/1966 | Copenhaver | 260—94.9 |
| 3,320,220 | 5/1967 | Di Drusco | 260—80.5 |
| 3,219,647 | 11/1965 | Dietz | 260—93.7 |
| 3,268,475 | 8/1966 | Hoch et al. | 260—45.9 |
| 3,098,058 | 7/1963 | Schweiker et al. | 260—45.5 |

JOSEPH L. SCHOFER, *Primary Examiner.*

WILLIAM F. HAMROCK, *Assistant Examiner.*

U.S. Cl. X.R.

260—83.3, 85.1, 96, 879